(12) United States Patent
Lee

(10) Patent No.: US 9,001,379 B2
(45) Date of Patent: Apr. 7, 2015

(54) IMAGE FORMING APPARATUS AND IMAGE FORMING METHOD THEREOF

(75) Inventor: Ho-Keun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1147 days.

(21) Appl. No.: 12/801,158

(22) Filed: May 25, 2010

(65) Prior Publication Data

US 2011/0134448 A1    Jun. 9, 2011

(30) Foreign Application Priority Data

Dec. 9, 2009  (KR) ........................ 10-2009-0121926

(51) Int. Cl.
*G06F 3/12* (2006.01)
*H04N 1/54* (2006.01)
*H04N 1/58* (2006.01)
*H04N 1/405* (2006.01)
*H04N 1/52* (2006.01)
*H04N 1/407* (2006.01)
*H04N 1/46* (2006.01)
*G06K 15/02* (2006.01)
*G03G 15/00* (2006.01)
*H04N 1/50* (2006.01)

(52) U.S. Cl.
CPC ............... *H04N 1/506* (2013.01); *G03G 15/50* (2013.01)

(58) Field of Classification Search
CPC .................................................. H04N 1/6008
See application file for complete search history.

(56) References Cited

U.S. PATENT DOCUMENTS

| 7,088,929 | B2 * | 8/2006 | Ahn ................................ 399/27 |
| 2002/0071689 | A1 * | 6/2002 | Miyamoto ...................... 399/53 |
| 2004/0004644 | A1 * | 1/2004 | Komatsu et al. ................ 347/15 |
| 2004/0070777 | A1 * | 4/2004 | Nishikawa et al. ............. 358/1.9 |
| 2006/0203277 | A1 * | 9/2006 | Suzuki ......................... 358/1.14 |
| 2007/0109336 | A1 * | 5/2007 | Ng .................................. 347/15 |
| 2008/0137132 | A1 * | 6/2008 | Perronnin ..................... 358/1.15 |
| 2008/0138093 | A1 * | 6/2008 | Son et al. .......................... 399/9 |
| 2008/0145072 | A1 * | 6/2008 | Eguchi .......................... 399/28 |
| 2009/0010536 | A1 * | 1/2009 | Mizukami ..................... 382/167 |
| 2009/0169226 | A1 * | 7/2009 | Fujiwara ........................ 399/46 |
| 2009/0273798 | A1 * | 11/2009 | Igarashi ........................ 358/1.9 |

FOREIGN PATENT DOCUMENTS

| JP | 2004-004296 | 1/2004 |
| JP | 2004-177736 | 6/2004 |
| JP | 2008-176289 | 7/2008 |

OTHER PUBLICATIONS

Korean Office Action issue Feb. 20, 2014 in corresponding Korean Patent Application No. 10-2009-0121926.

* cited by examiner

*Primary Examiner* — Beniyam Menberu
(74) *Attorney, Agent, or Firm* — Staas & Halsey LLP

(57) ABSTRACT

An image forming apparatus includes an input part for receiving image data; an image processor for image-processing the input image data; an output part for outputting data processed at the image processor; and a controller for controlling the image processor to process the image using one of a plurality of image processing modes having a toner consumption lower than a toner density to use when the toner density to use for outputting the input image data exceeds a preset reference density. The plurality of the image processing modes includes a boundary image processing mode which outputs only boundaries of objects in the image data. Thus, the toner used for the image forming can be saved.

6 Claims, 12 Drawing Sheets

FIG. 5A

| | |
|---|---|
| Lens(mm) | 1=6.33~19.0 |
| Lens f-number | F 3.5~4.4 |
| Zoom/Digital zoom | 3x/6x |
| Smart zoom | |
| Macro efficient distance | 8cm magnifying lens (1cm) |
| Exposure control | Auto, Program AE Scene mode |

FIG. 5C

| | |
|---|---|
| Lens(mm) | 1=6.33~19.0 |
| Lens f-number | F 3.5~4.4 |
| Zoom/Digital zoom | 3x/6x |
| Smart zoom | |
| Macro efficient distance | 8cm magnifying lens (1cm) |
| Scene mode | Auto, Program AE Scene mode |

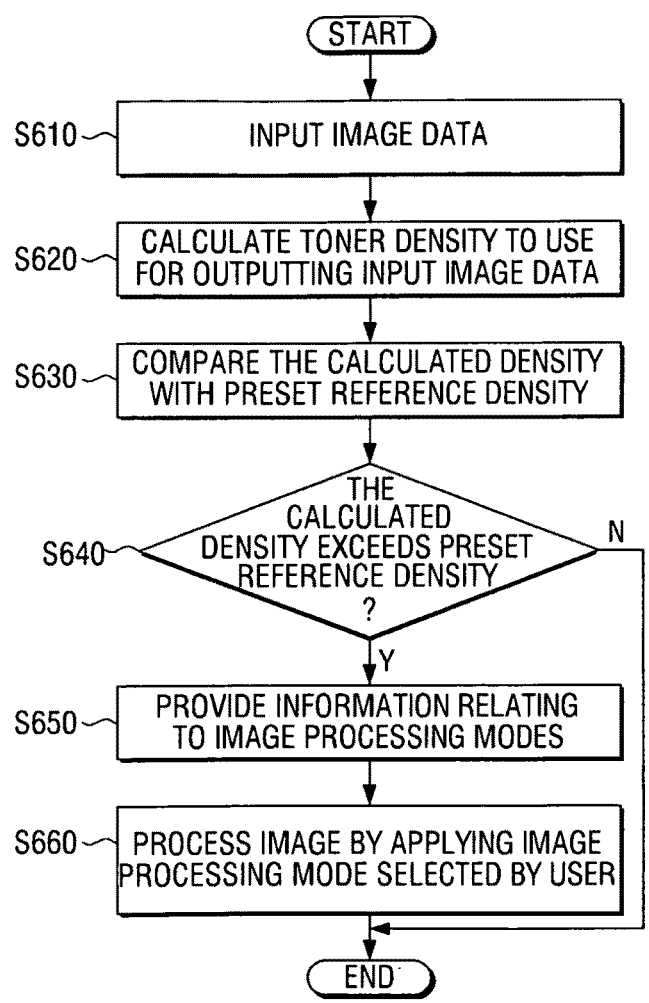

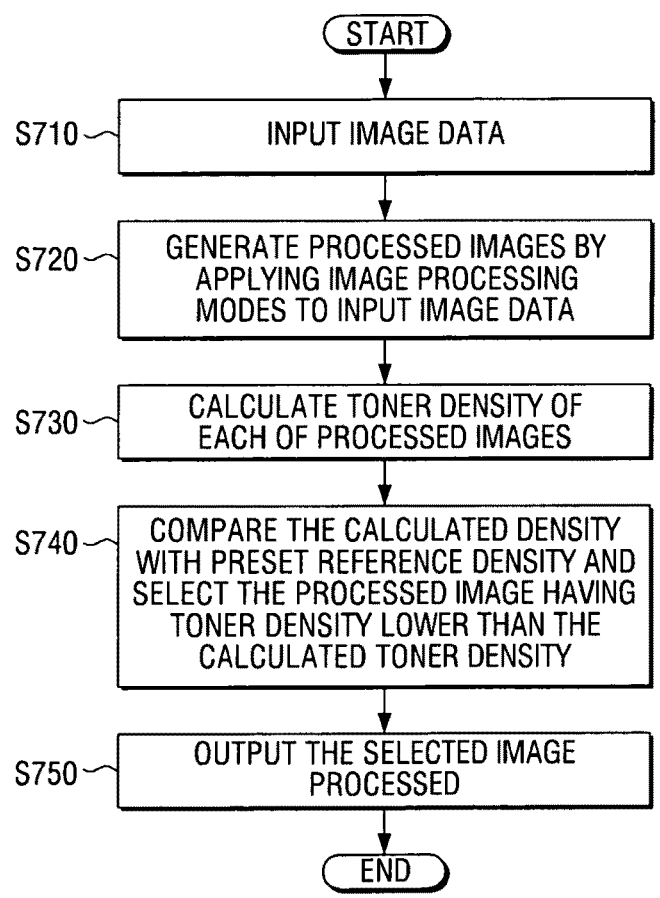

IMAGE FORMING APPARATUS AND IMAGE FORMING METHOD THEREOF

CROSS-REFERENCE TO RELATED APPLICATIONS

This application claims the benefit under 35 U.S.C. §119(a) from Korean Patent Application No. 2009-121926 filed Dec. 9, 2009 in the Korean Intellectual Property Office, the entire disclosure of which is incorporated herein by reference.

BACKGROUND

1. Field

The embodiments relate to an image forming apparatus for saving a toner used for image forming, and an image forming method thereof.

2. Description of the Related Art

As a result of the development of the electronics, computers and peripheral devices such as printers and scanners are prevalently used. In particular, manufactures of the printer are increasing development. Recently, the use of laser printers which are more effective than existing dot printers or inkjet printers in terms of the printing quality, the printing speed, and the noise in the printing is gradually increasing. The laser printer is a printer which applies a toner to a photoconductive drum using a laser beam converted to an image signal, transfers the toner on the surface of the photoconductive drum to a printing paper, and fuses the toner onto the printing paper using high heat and pressure.

To print the image, the operations of the laser printer largely include charging, writing, developing, transferring, and fusing. The charging generates the (−) charge on the surface of the photoconductive drum using a corona discharge by applying high voltage (about 7000V) to a charger. The writing forms a latent image by projecting the laser beam to the surface of the photoconductive drum of the (−) charge generated and removing the (−) charge in the character shape. In the developing, toner particles of the (−) charge are attached to the latent image on the surface of the photoconductive drum. The transferring attracts the (−) toner particles formed on the drum surface toward the paper by applying a transferring voltage to a transfer unit when the paper passes between the photoconductive drum and the transfer unit and generating (+) charge on the other side of the paper. Next, the fusing completely fuses the toner on the paper by applying appropriate heat and pressure. Through these processes, the image is formed and output on the paper.

Recently, color laser printers which realize colors using the laser method are supplied. The color printer generally realizes a color image using the toner of the four colors CMYK. To print the vivid image, the printing job can be processed per toner color using four photoconductive drums. To project the toner of each color to the accurate location, the transferring process can be carried out in two steps using an Intermediate Transfer Belt (ITB).

Meanwhile, when printing or copying an original document of the density greater than a certain level, or when copying the document while a cover of a scanner is not closed normally, a dark image unexpected by a user can be printed with the serious toner consumption.

In this regard, a toner saving method for preventing unnecessary toner consumption is necessary.

SUMMARY

To address the above-mentioned and other problems and disadvantages occurring in the conventional arrangement, an aspect provides an image forming apparatus for saving a toner and an image forming method thereof.

According to an aspect, an image forming apparatus includes an input part to receive image data; an image processor to image-process the input image data; an output part to output data processed at the image processor; and a controller to control the image processor to process the image using one of a plurality of image processing modes having a toner consumption lower than a toner density to use when the toner density to use to output the input image data exceeds a preset reference density. The plurality of the image processing modes may include a boundary image processing mode which outputs only boundaries of objects in the image data.

The image forming apparatus may further include a user interface part to provide information relating to the plurality of the image processing modes. The controller may control the image processor to process the image in an image processing mode selected from the information relating to the plurality of the image processing modes.

The image forming apparatus may further include a density calculator to calculate the toner density to use to output the input image data. When the toner density calculated at the density calculator exceeds the preset reference density, the controller may control the image processor to process the image in the boundary image processing mode.

The image forming apparatus may further include a user interface part; and a density calculator to calculate the toner density to use for outputting the input image data. When the toner density calculated at the density calculator exceeds the preset reference density, the controller may provide the information relating to the plurality of the image processing modes through the user interface part, and control the image processor to process the image in an image processing mode selected from the information relating to the plurality of the image processing modes.

The image forming apparatus may further include a density calculator to calculate the toner density to use to output the image processed at the image processor. The image processor may generate a plurality of images by applying the plurality of the image processing modes to the input image data respectively, and the controller may select the image to be output from the output part using toner densities calculated for the images generated at the image processor.

The image forming apparatus may further include a storage part to store information of the preset reference density. The controller may select the image having the toner density lower than the reference toner by comparing the toner densities calculated for the images generated at the image processor with the reference density stored to the storage part.

When there are multiple images having the toner density lower than reference density, the controller may select an image having a least difference between the reference density and the toner densities of the images.

When the toner density to use for outputting the input image data exceeds the preset reference density, the controller may control the image processor to process the image in one of the plurality of the image processing modes having the toner consumption lower than the preset reference density.

According to another aspect, an image forming apparatus include an input part to receive image data; an image processor to generate a plurality of images by applying a plurality of image processing modes to the input image data respectively; a density calculator to calculate a toner density to apply to the images generated at the image processor; an output part to output data processed at the image processor; and a controller to select an image to be output from the output part using the toner densities calculated for the plurality of the images generated at the image processor.

The image forming apparatus may further include a storage part to store reference density information. The controller may select an image having the toner density lower than the pre-stored reference toner or an image having the toner density of a least difference from the pre-stored reference density by comparing the toner densities calculated for the images generated at the image processor with the reference density information stored to the storage part.

According to yet another aspect, an image forming method includes receiving image data; processing the image in one of a plurality of image processing modes having a toner consumption lower than a toner density to be used when the toner density to use for outputting the input image data exceeds a preset reference density; and outputting the image-processed data. The plurality of the image processing modes may include a boundary image processing mode which outputs only boundaries of objects in the image data.

The image forming method may further include providing information relating to the plurality of the image processing modes. The processing of the image may process the image in an image processing mode selected from the information relating to the plurality of the image processing modes.

The image forming method may further include calculating the toner density to use for outputting the input image data. When the calculated toner density exceeds the preset reference density, the processing of the image may process the image in the boundary image processing mode.

The image forming method may further include calculating the toner density to use for outputting the input image data. The processing of the image may include when the calculated toner density exceeds the preset reference density, providing information relating to the plurality of the image processing modes, and processing the image in an image processing mode selected from the information relating to the plurality of the image processing modes.

The image forming method may further include calculating the toner density to use for outputting the processed image. The processing of the image may include generating a plurality of images by applying the plurality of the image processing modes to the input image data respectively, and selecting the image to output using toner densities calculated for the generated images.

The image forming method may further include storing information of the preset reference density. The processing of the image may select the image having the toner density lower than the reference toner by comparing the toner densities calculated for the generated images with the reference density stored to the storage part.

When there are multiple images having the toner density lower than reference density, the processing of the image may select an image having a least difference between the reference density and the toner density of each image.

When the toner density to use for outputting the input image data exceeds the preset reference density, the processing of the image may process the image in one of the plurality of the image processing modes having the toner consumption lower than the reference density.

According to still another aspect, an image forming method includes receiving image data; generating a plurality of images by applying a plurality of image processing modes to the input image data respectively; calculating toner densities to apply to the generated images; comparing the toner densities calculated for the images with reference density information pre-stored; selecting an image having the toner density lower than the pre-stored reference toner or an image having the toner density of a least difference from the pre-stored reference density among the plurality of the images; and outputting the selected image.

Hence, the toner used for the image forming can be saved. In addition, various image processing modes for saving the toner can be provided to the user.

Additional and/or other aspects and advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIGS. 5A, 5B and 5C are diagrams for comparing a negative halftoning and a positive halftoning according to various exemplary embodiment;

FIG. 6 is a flowchart of an image processing method according to an exemplary embodiment; and FIG. 7 is a flowchart of an image processing method according to another exemplary embodiment.

DETAILED DESCRIPTION

Figure 1:
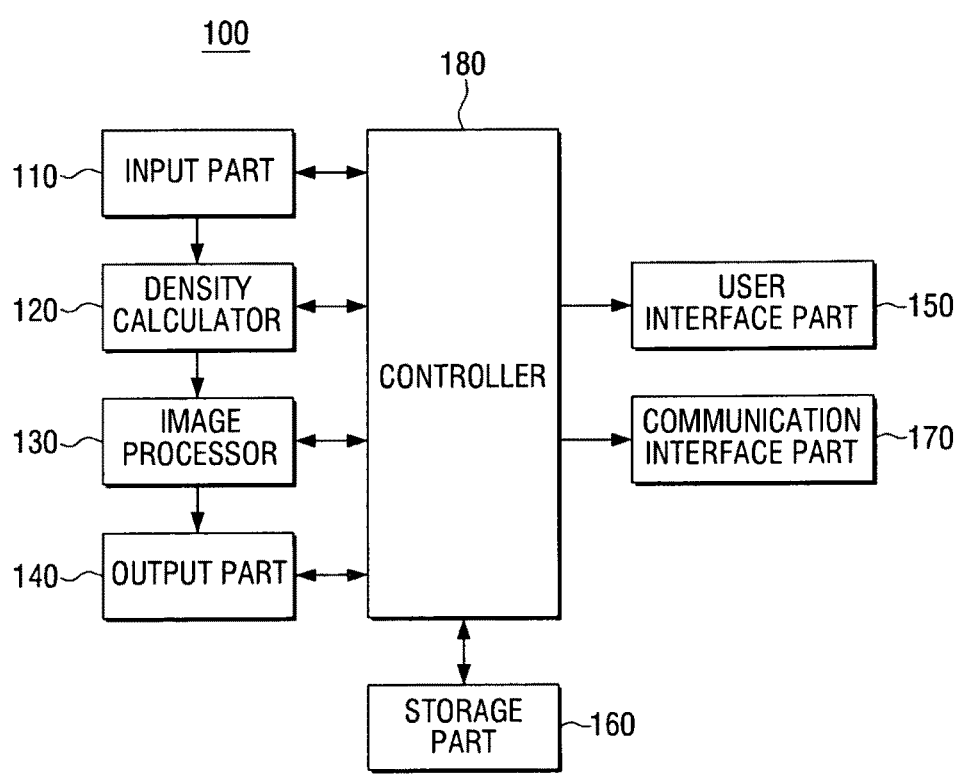
FIG. 1 is a block diagram of an image forming apparatus according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a block diagram of an image forming apparatus according to an exemplary embodiment.

The image forming apparatus 100 of FIG. 1 is connectable to an external device, supports a resource saving mode, and functions to output document data. The image forming apparatus 100 can be implemented in various types such as printer, scanner, copier, fax machine, and multifunction device which combines at least two of a printer function, a scanner function, a copier function, a fax function.

An input part 110 receives and generates scanned image or printing image. In more detail, the input part 110 can receive RGB rendering image generated through a driver or an emulation of a host device (not shown), or image scanned using an RGB sensor for the copy.

The input part 110, for example, can convert an 8-bit image generated with the RGB to a CMYK color image through the color conversion and generate as a 1-bit image (binary data) through a halftone process.

To print the image, the image forming apparatus, such as a printer, mostly adopts the halftone process. To represent the density of the shade by degrees, the halftone reproduces the steps of the shade with the number of dots in one halftone cell using the halftone grid cell including a plurality of dots. From a suitable distance, the halftone, which is not the continuous tone gradation like a full color printout of a dye-sublimation printer, is observed as the continuous imagery rather than just the dots.

The image data input through the image forming apparatus is represented in 256 gray scales. The halftone process is used because the toner of the image forming apparatus cannot freely vary the density like a light emitting body such as computer monitor and can merely determine whether to print the toner onto a printing paper.

More specifically, the input part 110 outputs a halftone result value by comparing the gray scale of the digital image of the original image data with a halftone table. The halftone result value is expressed as the image of the dots corresponding to the halftone result value, and the image data is printed by projecting the toner on the image of the represented dots.

A density calculator 120 can predict the toner consumption to be used in the document printing by calculating a halftone rate generated per channel with respect to the halftone CMKY 1-bit image. In more detail, the density calculator 120 can calculate the number of bits corresponding to the dot on (the dot where the toner is projected) per channel. In some cases, an expected density can be calculated by dividing the calculated number of the dot on pixels per channel by the total number of pixels. While the expected density for the CMKY 1-bit image is calculated in this exemplary embodiment, RGB 8-bit image or CMKY 8-bit image can be applied for the density prediction.

The density calculator 120 may be able to calculate a representative density by weighting and adding the channels. The representative density can be calculated based on Equation (1):

$$\text{(representative density)} = a*C \text{ channel density} + b*M \text{ channel density} + c*Y \text{ channel density} + d*K \text{ channel density} \quad (1)$$

An image processor 130 processes the image of the input data under the control of a controller 180. The image processor 130 can process the image to further reduce the density than the density (the toner or developer consumption) calculated by the density calculator 120. For example, the image processor 130 can execute the halftoning using a preset mask.

Unlike an image apparatus which represents the image using multi-level, the image forming apparatus 100 represents the image using the binary level of the two statuses according to the output of the dot. Hence, the image forming apparatus 100 needs to convert the multi-level image to the binary level image. As such, the conversion of the multi-level image to the binary level image is the halftoning.

The halftoning type includes screening, error diffusion, dithering, and so on, which are well known in the related art. Herein, the screening halftoning alone shall be described in brief.

The screening halftoning binarizes the pixel by comparing the gray scale (0 through 255) of the pixel with a preset screen.

In this exemplary embodiment, various screenings can be applied based on the font size of the text by controlling parameters, the number of dots, and the density applied to the screening.

For instance, edges constituting the text can be enhanced using one screening scheme. When edges of a small sized text are greatly enhanced, the change of the gray level is considerable and the defect such as legibility decrease can occur. Thus, when the font size of the identified text is smaller than a preset size, the edge is not enhanced or the enhancement degree can be regulated.

The edge enhancement process can be carried out in various manners. For example, a method for enhancing the edge in the digital image data A/D converted obtains the edge enhanced value by applying a window of a suitable size (3×3 or 5×5) around a target pixel currently processed including the target pixel.

An output part 140 prints and outputs the image data processed by the image processor 130 onto a recording medium under the control of the controller 180. For example, in a laser image forming apparatus, an OPC (not shown) surface is charged by a charging unit (not shown) and the latent image is formed by a LSU (not shown) over the charged region. When a developing unit (not shown) develops the image, the toner is attached to the latent image. Next, the image is transferred onto the paper by a transferring unit (not shown). The transferred toner is fixed to onto the paper by a fusing unit (not shown). Notably, this is a mere example and the image forming apparatus of the present invention is applicable to inkjet image forming apparatuses.

A user interface part 150 includes a manipulation key (not shown) for inputting a user's command to control the operations of the image forming apparatus, and a display window (not shown), such as Liquid Crystal Display (LCD), for displaying the status of the image forming apparatus. The user interface part 150 can be implemented using a device, such as touchpad, capable of inputting and outputting at the same time.

The user interface part 150 can display various information provided from the image forming apparatus 100, a progress and a result of the current job in the image forming apparatus 100. The user can confirm, manage and control various printing jobs of the image forming apparatus 100 through the user interface part 150.

A communication interface part 170 supports data communication with an external device (not shown) over a network. For example, the communication interface part 170 can be implemented to support a DLNA network, a local system, a Local Area Network (LAN) communication network, and Internet network. In particular, the communication interface part 170 can receive the RGB rendering image generated through the driver or the emulation of the host device (not shown) and provide the received RGB rendering image to the input part 110.

A storage part 160 can be implemented using a storage medium in the image forming apparatus 100, an external storage medium, for example, a removable disk including a USB memory, a storage medium connected to the host, and a web server via the network.

The storage part 160 can store a preset reference density required for provide the multiple image processing modes.

The controller 180 controls the operations of the components of the image forming apparatus 100 according to various programs pre-stored.

When the toner density to be used to output the image data fed through the input part 110 exceeds the preset reference density, the controller 180 can control the image processor 130 to process the image using one of the image processing modes which consume the toner less than the preset reference density.

More specifically, the controller 180 compares the density calculated by the density calculator 120 with the preset reference density. When the density calculated by the density calculator 120 exceeds the preset reference density, the controller 180 can control the user interface part 150 to provide the plurality of the image processing modes by way of example. If necessary, the controller 180 can control to provide the plurality of the image processing modes in other cases. For example, although the calculated density does not exceed the preset reference density, the plurality of the image processing modes can be provided for the various selections of the user.

Alternatively, in a toner saving mode, even when the calculated density does not exceed the preset reference density, the plurality of the image processing modes can be provided.

The user interface part 150 can provide information relating to the image processing modes according to an exemplary embodiment.

Herein, the plurality of the image processing modes can include an image processing method which outputs only boundaries of objects in the image data. In more detail, the image processing mode which outputs only the boundaries of the objects in the image data can extract the boundary of the object based on the size of a maximum value in the N×N window and a reference threshold.

The following Equation (2) can be used:

$$\text{(threshold for the halftoning)} = \text{Max}(\text{Max}\_K\_\text{local}(x, y) - T1, T2) \quad (2)$$

Equation (2) determines a maximum value for the offset of T1 of the local maximum value around the current pixel (x, y) of the K×K size, and T2 applied to the previous image, as a comparison value which determines whether or not to output the toner for the current pixel (x, y). Since the dot is output only to the bright text boundary in the dark region as a whole, the toner consumption can be reduced.

The plurality of the image processing modes can include a mode using the mask processing which reduces the toner consumption in the background, a mode using different mask processing per object (text, graphic, image), and a mask processing mode excluding the boundaries.

The controller 180 can control the image processor 120 to process the image using the image processing mode selected by the user among the information relating to the multiple image processing modes provided through the user interface part 150.

Figure 2:
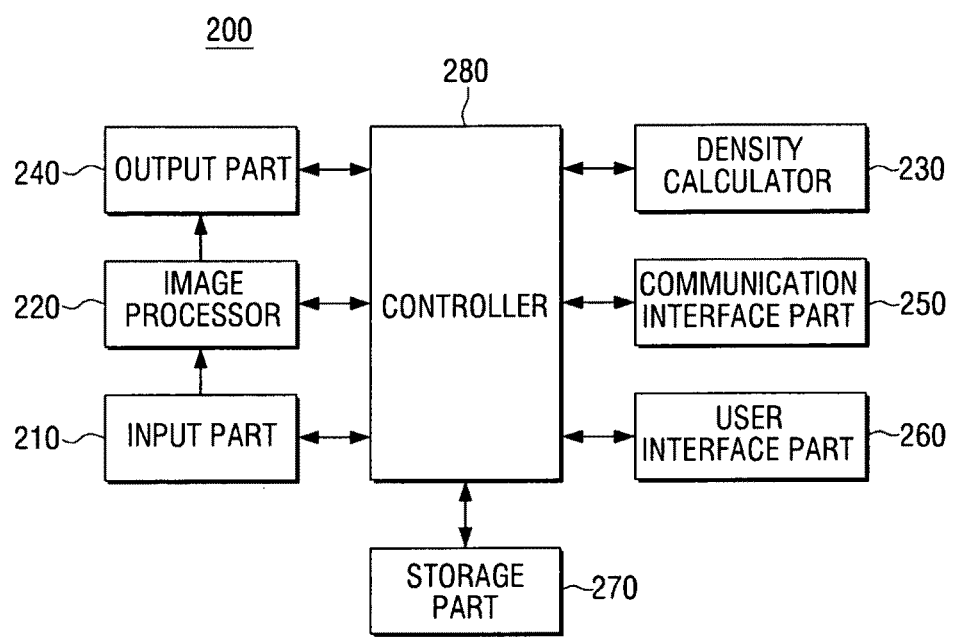
FIG. 2 is a block diagram of an image forming apparatus according to another exemplary embodiment.

While the components of the image forming apparatus 100 are controlled by the controller 180 in this exemplary embodiment by way of example, all of the functions mentioned above can be controlled through a printer driver (not shown) or an application (not shown) of the host device (not shown) connected to the image forming apparatus 100, which shall be described by referring to FIG. 2.

FIG. 2 is a block diagram of an image forming apparatus according to another exemplary embodiment.

The image forming apparatus 200 of FIG. 2 is connectable to an external device, supports the resource saving mode, and functions to output document data. The image forming apparatus 200 can be implemented in various types such as printer, scanner, copier, fax machine and multifunction device which combines at least two of a printer function, a scanner function, a copier function, a fax function.

An input part 210 receives and generates scanned image or printing image. In more detail, the input part 210 can receive RGB rendering image generated through a driver or an emulation of a host device (not shown), or image scanned using an RGB sensor for the copy.

The input part 210 can convert, for example, an 8-bit image generated with the RGB to a CMYK color image through the color conversion.

An image processor 220 processes the image of the input data under the control of a controller 280.

In more detail, the image processor 220 can generate the 8-bit image converted to the CMYK color image, to a plurality of corresponding 1-bit images (binary data) through the plurality of the image processing modes. The image processor 220 can conduct the halftoning to the 8-bit image converted to the CMYK color image. For example, the image processor 220 can use a halftone table and a boundary extraction method.

A density calculator 230 can predict the toner amount to be consumed for the document output by calculating the halftone rate generated per channel with respect to the plurality of the CMKY 1-bit images processed by the image processor 220.

A controller 280 can select one of the plurality of the processed images by comparing the toner consumption based on the density predicted by the density calculator 230 with the toner consumption based on a preset reference density.

More specifically, among the plurality of the processed images, the controller 280 can select the image having the density value of the least difference (the minimum value) from the preset reference density.

An output part 240 prints and outputs the data processed by the image processor 220 onto a recoding medium under the control of the controller 280.

Under the control of the controller 280, the output part 240 can output the image data having the density value of the least difference from the preset reference density among the plurality of the image data processed by the image processor 220.

A communication interface part 250 supports data communication with an external device (not shown) over a network. For example, the communication interface part 250 can be implemented to support the DLNA network, the local system, the LAN communication network, and the Internet network. In particular, the communication interface part 250 can receive the RGB rendering image generated through the driver or the emulation of the host device (not shown) and provide the received RGB rendering image to the input part 210.

A user interface part 260 includes a manipulation key (not shown) for inputting a user's command to control the operations of the image forming apparatus, and a display window (not shown), such as LCD, for displaying the status of the image forming apparatus. The user interface part 260 can be implemented using a device, such as touchpad, capable of inputting and outputting at the same time.

The user interface part 260 can display various information provided from the image forming apparatus 200, a progress and a result of the current job in the image forming apparatus 200. The user may confirm, manage and control various printing jobs of the image forming apparatus 200 through the user interface part 260.

A storage part 270 can be implemented using a storage medium in the image forming apparatus 200, an external storage medium, for example, a removable disk including a USB memory, a storage medium connected to the host, and a web server via the network.

The storage part 270 can store data relating to the plurality of the image processing modes applied to the image processor 220.

According to various programs pre-stored, the controller 280 controls the operations of the components of the image forming apparatus 200.

More specifically, the controller 280 compares the density calculated by the density calculator 230 with the preset reference density. When the density calculated by the density calculator 230 exceeds the preset reference density, the controller 280 can control the user interface part 260 to provide the plurality of the image processing modes. Herein, the plurality of the image processing modes can include an image processing mode which outputs only boundaries of objects in the image data. For example, the boundary of the object can be extracted according to the size of the maximum value in the N×N window and the reference threshold.

While the method to which the image processing is applied is controlled through the components of the image forming apparatus 100 and 200 in this exemplary embodiment, this is a mere example. All of those functions can be controlled via a printer driver (not shown) or an application (not shown) of the host device (not shown) connected with the image forming apparatus 100 and 200, which is described by referring to FIG. 3.

Figure 3:
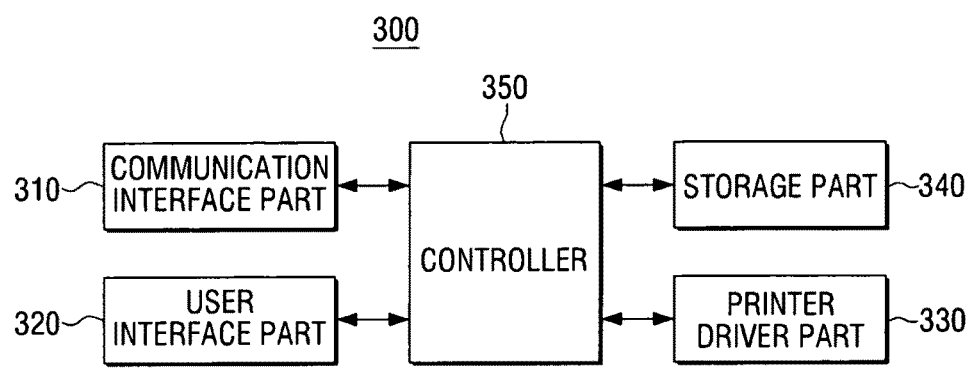
FIG. 3 is a block diagram of a printing control terminal according to an exemplary embodiment.

FIG. 3 is a block diagram of a printing control terminal according to an exemplary embodiment. In FIG. 3, the function corresponding to the image forming apparatus 100 of FIG. 1 is performed through the printing control terminal 300. Explanations on a case where the function corresponding to the image forming apparatus 200 of FIG. 2 is performed via a printing control terminal (not shown) shall be omitted herein.

The printing control terminal 300 of FIG. 3 is connected to the image forming apparatus which outputs the document data. The printing control terminal 300 includes not only a personal computer but also a notebook, a PDA, a PMP, and a portable phone.

A communication interface part 310 is connected to at least one image forming apparatus, and provides the printing data converted for the printing job (the converted document data and the selected output option information) to the image forming apparatus. In more detail, the communication interface part 310 is formed to interconnect the printing control terminal 300 with the image forming apparatus and can be implemented using a parallel port, a Universal Serial Bus (USB) port, and a wireless module.

The communication interface part 310 can send the RGB rendering image generated through a printer driver part 330 or the emulation, to the image forming apparatus.

A user interface part 320 includes a plurality of function keys for the user to set or select the various functions supported by the printing control terminal 300. The user interface part 320 can be implemented using a device, such as touchpad, capable of inputting and outputting at the same time, or a mouse. Through the user interface part 320, the user can select the document data to output through the image forming apparatus connected via the communication interface part 310, and select the output option to apply to the selected document data.

The user interface part 320 displays various information provided from the printing control terminal 300. The user interface part 320 can provide the plurality of the image processing modes to the user.

The objects and the type displayed in the user interface part 320 are substantially the same as in the user interface part 130 of the image forming apparatus 100 of FIG. 1 and thus not explained in further detail.

A printer driver part 330 includes a plurality of drivers corresponding to a plurality of languages, and is able to execute the printing job with respect to the plurality of the image forming apparatuses operating in different languages. More specifically, when the user wants to print a document written using an application program, the printer driver part 330 can generate the printing data in the printing language interpretable by the image forming apparatus which is to perform the printing job of the user. For example, the printer driver part 330 can generate the RGB rendering image of the image to process.

A storage part 340 can store the image forming apparatus information received from the communication interface part 310. The storage part 340 can temporarily store the printing data generated by the printer driver part 330, which will be described, and pre-store a scripter containing print options supported per image forming apparatus model and printing language information supported.

Using the printer driver part 330, a controller 350 controls the necessary components to execute the printing job according to the output option selected at the image forming apparatus.

Those skilled in the art will understand that the printing control terminal 300 can be applied to the image forming apparatus 100 or 200 FIG. 1 or FIG. 2 within the range of the possible image forming job using the printer driver part 330, of which detailed explanations shall be omitted here.

FIGS. 4A through 4D are diagrams of image processing modes according to various exemplary embodiment.

In FIGS. 4A through 4D, an open circle "○" indicates no toner on the printing paper and a closed circle "•" indicates the toner on the printing paper.

Figure 4A:
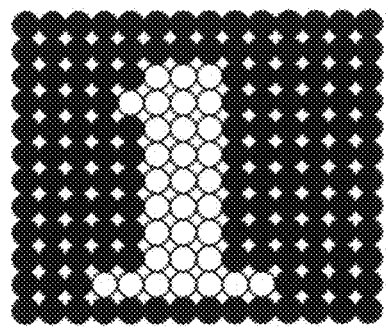
FIGS. 4A through 4D are diagrams of image processing modes according to various exemplary embodiment.
Figure 4B:
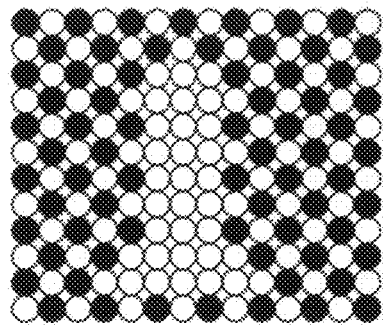
Figure 4C:
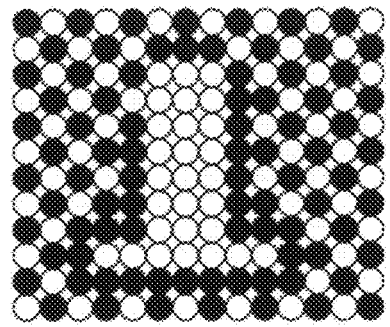
Figure 4D:
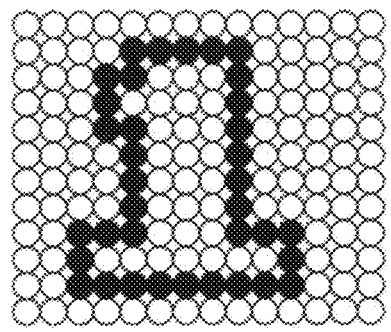

FIG. 4A depicts the result after the general halftoning process is applied to the text, and FIGS. 4B, 4C and 4D depict the results after the halftoning process for the toner saving is applied.

In FIG. 4A, the halftone is applied to the text in the general negative method.

In FIGS. 4B, 4C and 4D, the halftoning is carried out in the halftoning manner for the toner saving.

Referring to FIG. 4B, the toner can be saved by performing the halftoning using the mask to reduce the toner in the background with respect to the negative halftone text.

In addition to the halftoning of FIG. 4C, the toner can be saved through the halftoning using the mask which emphasizes the boundary.

Referring to FIG. 4D, the toner can be saved using the halftoning which outputs only the boundary of the text.

The image processing modes in FIGS. 4B and 4C can be included to the plurality of the image processing modes of FIGS. 1, 2 and 3.

Figure 5B:
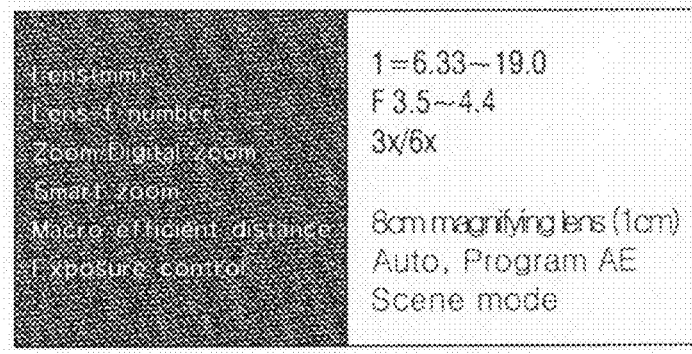

FIGS. 5A, 5B and 5C are diagrams for comparing the negative halftoning and the positive halftoning according to various exemplary embodiments.

FIG. 5A shows the results of the general negative halftone and the general positive halftone.

FIGS. 5B and 5C show the results of the halftone for the toner saving applied to the present invention.

Referring to FIG. 5B, the toner can be saved by performing the halftoning using the mask to reduce the toner in the background with respect to the negative halftone text.

In FIG. 5C, the toner can be saved using the halftoning which outputs only the boundary of the text with respect to the negative mode.

FIG. 6 is a flowchart of an image processing method according to an exemplary embodiment.

When receiving the image data (S610), the image processing method of FIG. 6 calculates the toner density to use for the output of the input image data (S620).

The image processing method compares the density calculated for the input image data in S620 with the preset density (S630).

After the comparison in S630, when the density calculated for the input image data exceeds the preset density (S640:Y), the image processing method provides the information relating to the plurality of the image processing modes (S650).

Next, the image processing method processes the image by applying the image processing mode selected by the user among the image processing modes provided in S650 (S660).

FIG. 7 is a flowchart of an image processing method according to another exemplary embodiment.

When receiving the image data (S710), the image processing method of FIG. 7 generates a plurality of images by applying the plurality of the image processing modes to the input image data (S720).

The image processing method calculates the density for each image generated in S720 (S730).

By comparing the toner densities calculated in S730 with the pre-stored reference density information, the image processing method selects the image having the toner density lower calculated toner density (S740). In so doing, the image processing method can select the image having the toner density of the least difference from the reference density, and the image having the toner density lower than reference density. When there are multiple images having the toner density lower than the reference density, the image having the least difference between the reference density and the toner density can be selected.

Next, upon selecting the image processed, the selected image can be output on the recording medium (S750).

Thus, the toner used for the image forming can be saved.

In addition, various image processing modes for the toner saving can be provided to the user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising:
   an input part to receive image data;
   a storage part to store information of a preset reference density
   an image processor to generate a plurality of images by applying a plurality of image processing modes to the input image data respectively;
   a density calculator to calculate a toner density to apply to the plurality of images generated at the image processor, the density calculator being configured to calculate the toner density for all of the plurality of images only after all of the plurality of images have been generated;
   an output part to output an image; and
   a controller to select the image having the toner density lower than the reference density among the plurality of the images by comparing the toner densities calculated for the plurality of images generated at the image processor with the reference density, when the toner density to use to output the input image data exceeds the reference density, and to control the output part to output the selected the image.

2. The image forming apparatus of claim 1,
   wherein the plurality of the image processing modes comprises a boundary image processing mode which outputs only boundaries of objects in the image data.

3. The image forming apparatus of claim 1, wherein, when there are multiple images having the toner density lower than reference density, the controller selects an image having a least difference between the reference density and the toner densities of the images.

4. An image forming method comprising:
   receiving image data;
   generating a plurality of images by applying a plurality of image processing modes to the input image data respectively;
   calculating toner densities to apply to the plurality of images after all of the plurality of images have been generated;
   comparing the toner densities calculated for the plurality of images with a preset reference density, when the toner density to use to output the input image data exceeds the reference density;
   selecting an image having the toner density lower than the reference density among the plurality of images; and
   outputting the selected image.

5. The image forming method of claim 4,
   wherein the plurality of the image processing modes comprises a boundary image processing mode which outputs only boundaries of objects in the image data.

6. The image forming method of claim 4, wherein, when there are multiple images having the toner density lower than reference density, the processing of the image selects an image having a least difference between the reference density and the toner density of each image.

* * * * *